United States Patent
Garagnani et al.

(10) Patent No.: US 11,753,978 B2
(45) Date of Patent: Sep. 12, 2023

(54) METHOD TO CONTROL AN EXHAUST GAS AFTER-TREATMENT SYSTEM FOR AN EXHAUST GAS SYSTEM OF AN INTERNAL COMBUSTION ENGINE

(71) Applicant: MARELLI EUROPE S.P.A., Corbetta (IT)

(72) Inventors: Nicola Garagnani, Corbetta (IT);
Umberto Di Martino, Corbetta (IT);
Valerio De Rito, Corbetta (IT);
Massimo Zanotti, Corbetta (IT);
Giuseppe Cialeo, Corbetta (IT)

(73) Assignee: MARELLI EUROPE S.P.A., Corbetta (IT)

(*) Notice: Subject to any disclaimer, the term of this patent is extended or adjusted under 35 U.S.C. 154(b) by 0 days.

(21) Appl. No.: 17/817,685

(22) Filed: Aug. 5, 2022

(65) Prior Publication Data
US 2023/0049216 A1     Feb. 16, 2023

(30) Foreign Application Priority Data
Aug. 10, 2021  (IT) .................. 102021000021665

(51) Int. Cl.
*F01N 3/20*     (2006.01)
*F01N 3/32*     (2006.01)
(Continued)

(52) U.S. Cl.
CPC ............. *F01N 3/2033* (2013.01); *F01N 3/32* (2013.01); *F01N 3/36* (2013.01); *F01N 3/38* (2013.01);
(Continued)

(58) Field of Classification Search
CPC . F01N 3/2033; F01N 3/32; F01N 3/36; F01N 3/38; F01N 2240/14; F01N 2610/03; F01N 2610/146; F01N 2900/1406
See application file for complete search history.

(56) References Cited

U.S. PATENT DOCUMENTS 5,353,591 A * 10/1994 Kabasin .................. F23N 5/203
                                                      60/274
5,379,592 A    1/1995 Waschkuttis
(Continued)

FOREIGN PATENT DOCUMENTS

DE    10211115 A1    9/2003
EP    3686404 A1    7/2020

OTHER PUBLICATIONS

Search Report for Italian Patent Application No. 202100021665 dated Apr. 1, 2022.

*Primary Examiner* — Audrey B. Walter
(74) *Attorney, Agent, or Firm* — Howard & Howard Attorneys PLLC

(57) ABSTRACT

A method is disclosed to control an exhaust gas after-treatment system with at least one catalytic converter arranged along an exhaust duct and a burner, which is suited to introduce exhaust gases into the exhaust duct, wherein inside the burner there is defined a combustion chamber, which receives fresh air through an air feeding circuit and fuel from an injector; the method comprises housing a temperature and pressure sensor interposed between a pumping device and the burner or leaving the burner; acquiring the pressure signal generated by the combustion inside the combustion chamber and detected by said temperature and pressure sensor; and controlling the combustion inside the combustion chamber as a function of said pressure signal.

10 Claims, 5 Drawing Sheets

(51) Int. Cl.
*F01N 3/36* (2006.01)
*F01N 3/38* (2006.01)
(52) U.S. Cl.
CPC ...... *F01N 2240/14* (2013.01); *F01N 2610/03* (2013.01); *F01N 2610/146* (2013.01); *F01N 2900/1406* (2013.01)

(56) References Cited

U.S. PATENT DOCUMENTS

| | | | |
|---|---|---|---|
| 5,571,484 A | * | 11/1996 | Pettit .................... F01N 3/2033 422/177 |
| 2003/0221425 A1 | | 12/2003 | Posselt et al. |
| 2007/0157606 A1 | * | 7/2007 | Schenck Zu Schweinsberg ......... F01N 3/36 60/303 |
| 2010/0154745 A1 | * | 6/2010 | Gaiser .................... F23N 1/022 431/89 |
| 2011/0203261 A1 | | 8/2011 | Kotrba et al. |
| 2019/0301324 A1 | * | 10/2019 | Wang ...................... F01N 3/035 |
| 2020/0232364 A1 | | 7/2020 | Baron Von Ceumern-Lindenstjerna et al. |

* cited by examiner

METHOD TO CONTROL AN EXHAUST GAS AFTER-TREATMENT SYSTEM FOR AN EXHAUST GAS SYSTEM OF AN INTERNAL COMBUSTION ENGINE

CROSS-REFERENCE TO RELATED APPLICATIONS

This patent application claims priority from Italian patent application no. 102021000021665 filed on Aug. 10, 2021, the entire disclosure of which is incorporated herein by reference.

TECHNICAL FIELD

The invention relates to a method to control an exhaust gas after-treatment system for an exhaust system of an internal combustion engine.

PRIOR ART

An internal combustion engine is typically provided with a number of cylinders, each connected to an intake manifold and to an exhaust manifold, to which an exhaust duct is connected in order to feed the exhaust gases produced by the combustion to an exhaust system, which releases the exhaust gases produced by the combustion into the atmosphere.

An exhaust gas after-treatment system usually comprises a pre-catalytic converter, which is arranged along the exhaust duct; a particulate filter, which is also arranged along the exhaust duct, downstream of the pre-catalytic converter; and a catalytic converter, which is arranged along the exhaust duct, upstream of the particulate filter.

The exhaust gas after-treatment system finally comprises, in addition, a burner, which is suited to introduce exhaust gases (and, as a consequence, heat) into the exhaust duct in order to speed up the heating of the catalytic converter and so as to facilitate the regeneration of the particulate filter. Inside the burner there is defined a combustion chamber, which receives fresh air from an air feeding circuit and receives fuel from an injector, which is suited to inject fuel into the combustion chamber. Furthermore, a spark plug is coupled to the burner in order to ignite the mixture present inside the combustion chamber.

The exhaust gases produced by the burner have a pollutant concentration that proves to be particularly high during an initial burner starting phase. During this initial phase, the temperature of the catalytic converter is lower than the activation temperature and, therefore, the catalytic converter has an extremely low power of conversion of the pollutants produced by the burner.

U.S. Pat. No. 5,379,592 discloses a known method to control an exhaust gas after-treatment system for an exhaust system of an internal combustion engine.

Hence, the pollutants released into the atmosphere and produced both by the internal combustion engine and by the burner, especially during the burner starting phase, must be reduced.

DESCRIPTION OF THE INVENTION

The object of the invention is to provide a method to control a burner for an exhaust system of an internal combustion engine, said method not suffering from the drawbacks described above and, in particular, being easy and economic to be implemented.

According to the invention there is provided a method to control a burner for an exhaust system of an internal combustion engine according to the appended claims.

BRIEF DESCRIPTION OF THE DRAWINGS

The invention will now be described with reference to the accompanying drawings showing a non-limiting embodiment thereof, wherein.

PREFERRED EMBODIMENTS OF THE INVENTION

Figure 1:
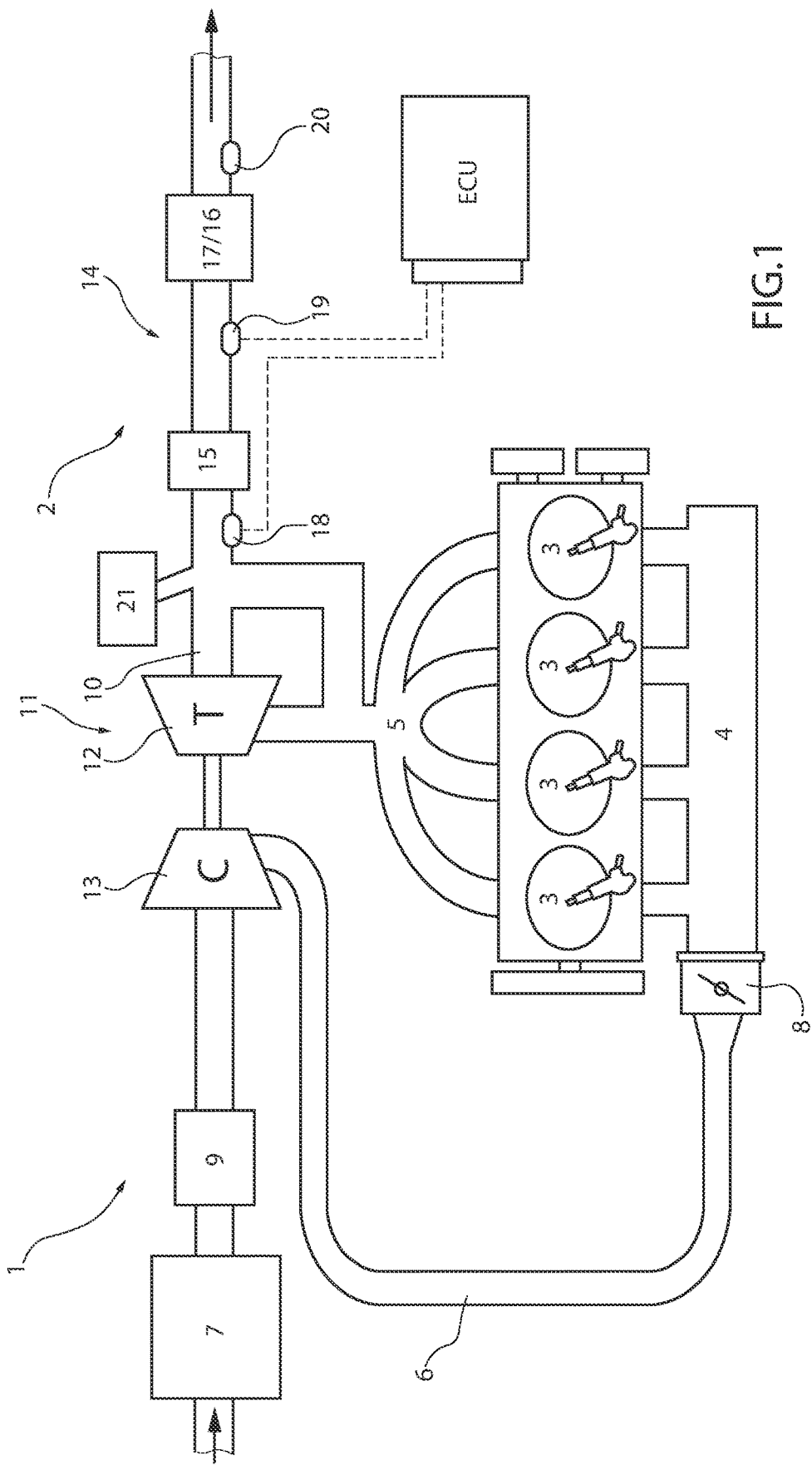
FIG. 1 schematically shows an internal combustion engine provided with an exhaust gas after-treatment system.

In FIG. 1, number 1 indicates, as a whole, a supercharged internal combustion engine provided with an exhaust system 2 (not shown) and having a number of cylinders 3, each connected to an intake manifold 4 and to an exhaust manifold 5 by means of at least one respective exhaust valve (not shown).

The intake manifold 4 receives a gas mixture comprising both exhaust gases and fresh air, i.e. air coming from the outside through an intake duct 6, which is provided with an air filter for the fresh air flow and is regulated by a throttle valve 8. Along the intake duct 6, downstream of the air filter 7, there also is an air flow meter 9.

The exhaust manifold 5 is connected to an exhaust duct 10, which feeds the exhaust gases produced by the combustion to the exhaust system 2, which releases the gases produced by the combustion into the atmosphere.

The supercharged internal combustion engine 1 comprises supercharging system for the internal combustion engine 1 obtained by means of a turbocharger 11 provided with a turbine 12, which is arranged along the exhaust duct 10 so as to rotate at a high speed due to the action of the exhaust gases expelled from the cylinders 3, and a compressor 13, which is arranged along the intake duct 6 and is mechanically connected to the turbine 12 so as to be caused to rotate by the turbine 12 itself in order to increase the pressure of the air present in the feeding duct 6.

The exhaust system 2 is provided with an exhaust gas after-treatment system 14 comprising a pre-catalytic converter 15 arranged along the exhaust duct 10, downstream of the turbocharger 11, and a particulate filter 16 (also known as Gasoline Particulate Filter) also arranged along the exhaust duct 10, downstream of the pre-catalytic converter 15. According to a preferred variant, the exhaust gas after-treatment system 14 is provided with a catalytic converter 17 arranged along the exhaust duct 10, upstream of the particulate filter 16. According to a preferred embodiment, the catalytic converter 17 and the particulate filter 16 are arranged one after the other on the inside of a common tubular container.

According to a first variant, the internal combustion engine 1 is further provided with a UHEGO or UEGO linear oxygen sensor 18 housed along the exhaust duct 10 and interposed between the turbocharger 11 and the pre-catalytic converter 15 to detect the air/fuel ratio of the exhaust gases (providing a liner output that indicates the content of oxygen in the exhaust gases) downstream of the turbocharger 11 and upstream of the pre-catalytic converter 15.

The internal combustion engine is further provided with a lambda sensor 19, which is suited to provide an on/off binary output, which indicates whether the air/fuel ratio of the exhaust gases is higher or lower than the stoichiometric value, is housed along the exhaust duct 10 and is interposed between the pre-catalytic converter 15 and the assembly defined by the catalytic converter 17 and the particular filter 16 in order to detect the concentration of oxygen in the exhaust gases downstream of the pre-catalytic converter 15; and, finally, a lambda sensor 20, which is suited to provide an on/off binary output, which indicates whether the air/fuel ratio of the exhaust gases is higher or lower than the stoichiometric value, is housed along the exhaust duct 10 and is arranged downstream of the assembly defined by the catalytic converter 17 and the particular filter 16 in order to detect the concentration of oxygen in the exhaust gases downstream of the assembly defined by the catalytic converter 17 and the particular filter 16.

The exhaust gas after-treatment system 14 further comprises a burner 21, which is suited to introduce exhaust gases (and, as a consequence, heat) into the exhaust duct 10 in order to speed up the heating of the pre-catalytic converter 15 and/or of the catalytic converter 17 and so as to facilitate the regeneration of the particulate filter 16. The burner 21 is arranged so as to introduce exhaust gases into the exhaust duct 10 upstream of the pre-catalytic converter 15 or downstream of the catalytic converter 17.

Figure 2:
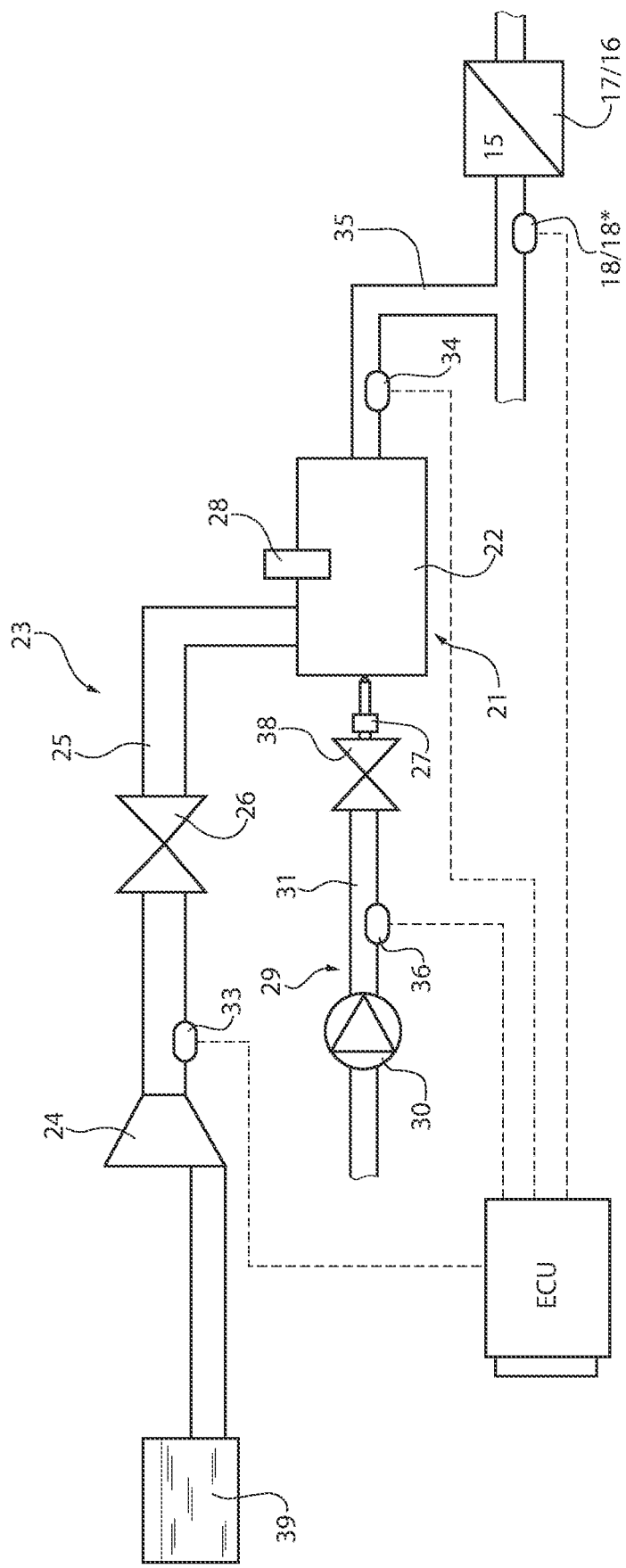
FIG. 2 schematically shows a detail of the exhaust gas after-treatment system shown in FIG. 1.

According to FIG. 2, inside the burner 21 there is defined a combustion chamber 22, which receives fresh air (i.e. air coming from the outside) through an air feeding device 23, which is provided with a pumping device 24 pumping from a tank 39, preferably with the interposition of a manifold air filtering element, and feeds air by means of a duct 25.

The combustion chamber 22 further receives fuel from an injector 27, which is suited to inject fuel into the combustion chamber 22. Furthermore, a spark plug 28 is coupled to the burner 21 in order to ignite the mixture present inside the combustion chamber 22. The internal combustion engine 1 also comprises a fuel feeding circuit 29 provided with a pumping device 30, which feeds fuel by means of a duct 31, which is adjusted by a valve 38.

The internal combustion engine 1 finally comprises a control system 32, which is designed to control the operation of the internal combustion engine 1. The control system 32 comprises at least one electronic control unit (also known as "ECU"), which controls the operation of the different components of the internal combustion engine 1. It is evident that the electronic control unit ECU disclosed in the description above can be a dedicated control unit ECU, which controls the operation of the burner 21, or can be the electronic control unit ECU controlling the operation of the internal combustion engine 1. The spark plug 28 is controlled by the electronic control unit ECU so as to generate a spark between its electrodes, thus determining the ignition of the gases compressed inside the combustion chamber 22. The control system 32 further comprises a plurality of sensors connected to the electronic control unit ECU.

The sensors comprise, in particular, a temperature and pressure sensor 33 for the air flow fed to the burner 21, which is preferably housed along the duct 25; a temperature and pressure sensor 34 for the exhaust gases flowing out of the burner 21, which is housed along an outlet duct 35; a pressure sensor 36 for the fuel fed to the burner 21, which is housed along the duct 31. The electronic control unit ECU is further connected to the UHEGO or UEGO linear oxygen sensor 18 and to the lambda sensors 19, 20, from which it receives signals indicative of the air/fuel ratio of the exhaust gases.

Figure 3:
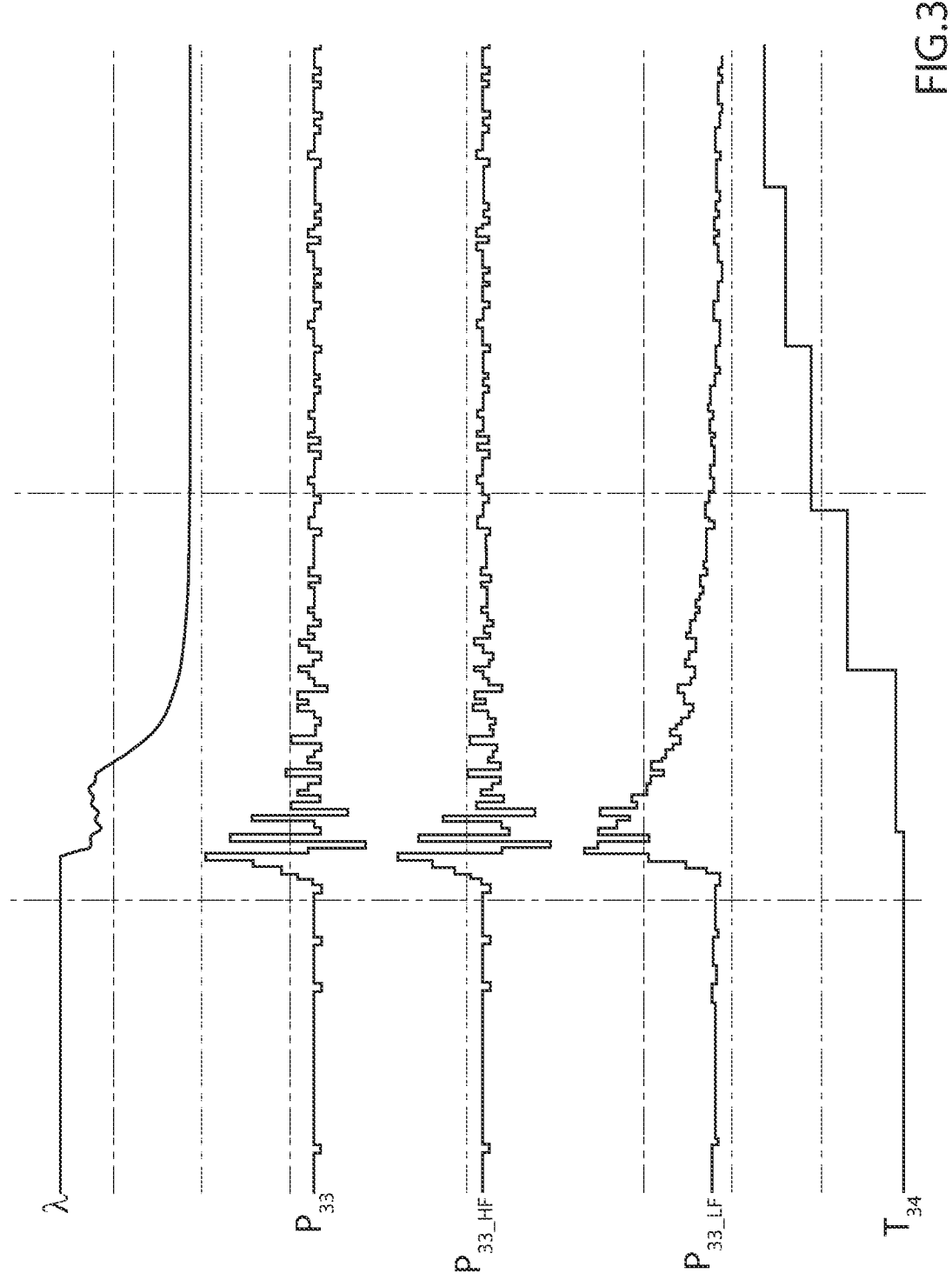
FIGS. 3 to 5 show the development of some characteristic quantities detected by means of the sensors of the exhaust gas after-treatment system shown in FIG. 1.

FIG. 3 shows the development of the air/fuel ratio $\lambda$ of the exhaust gases, the pressure signal $P_{33}$ generated by the combustion inside the burner 21 and detected by the sensor 33, the high-frequency content $P_{33\_HF}$ of the pressure signal generated by the combustion inside the burner 21 and detected by the sensor 33, the low-frequency content $P_{33\_LF}$ of the pressure signal generated by the combustion inside the burner 21 and detected by the sensor 33 and the temperature $T_{34}$ detected by the sensor 34.

Experiments have shown that the pressure signal generated by the combustion inside the burner 21 and detected by the temperature and pressure sensor 33 is rich in information. More in detail, the high-frequency content $P_{33\_HF}$ of the pressure signal generated by the combustion inside the burner 21 and detected by the sensor 33 is particularly rich in information.

In particular, the Applicant found out, through experiments, that the high-frequency content $P_{33\_HF}$ of the pressure signal detected by the sensor 33 identifies the start of combustion instant SOC represented by the instant in which the high-frequency content $P_{33\_HF}$ of the pressure signal detected by the sensor 33 is greater than a threshold value $TV_{SOC}$. The threshold value $TV_{SOC}$ is determined in a preliminary set-up phase.

The high-frequency content $P_{33\_HF}$ of the pressure signal detected by the sensor 33 further identifies the starting time SOC_T through the difference between the start of injection instant SOI (namely, the instant in which the injection of fuel into the combustion chamber 22 starts, which is known to the electronic control unit ECU) and the start of combustion instant SOC.

Then, the peak value $PK_{P2HF}$ of the high-frequency content $P_{33\_HF}$ of the pressure signal detected by the sensor 33 (i.e. the maximum value assumed by the high-frequency content of the pressure signal detected by the sensor 33) is measured.

Finally, the high-frequency content $P_{33\_HF}$ of the pressure signal detected by the sensor 33 controls—by means of a feedback control—the objective quantity $\dot{m}_{FUEL-OBJ}$ of fuel to be injected and the objective quantity $\dot{m}_{AIR-OBJ}$ of air to be fed. In particular, both aforesaid quantities (i.e. the objective quantity $\dot{m}_{FUEL-OBJ}$ of fuel to be injected and the objective quantity $\dot{m}_{AIR-OBJ}$ of air to be fed are determined as a function of the starting time SOC_T and of the peak value $PK_{P2HF}$ of the high-frequency content of the signal detected by the sensor 33.

Figure 4:
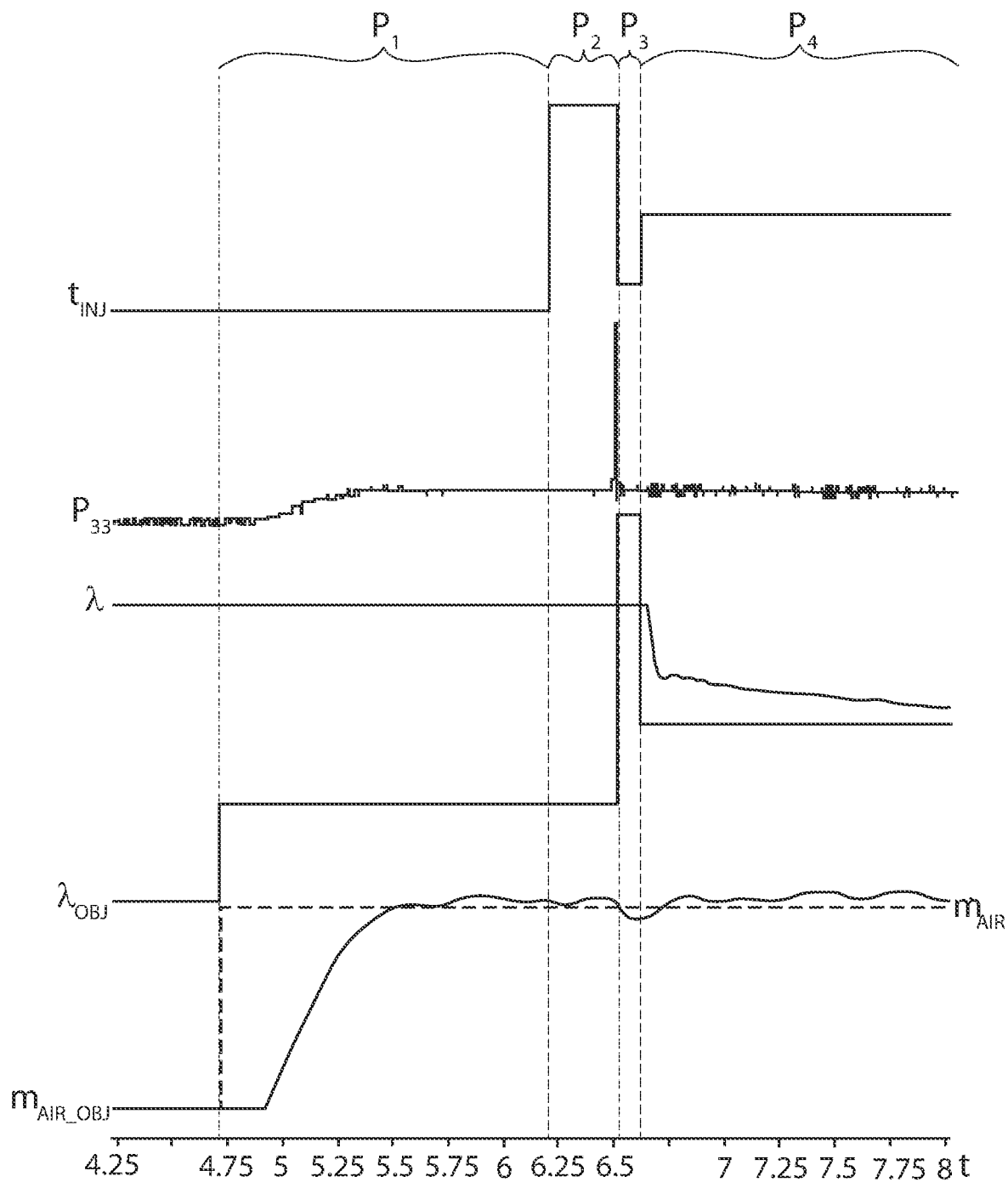

According to a preferred embodiment, the management of the burner 21 is divided into distinct steps shown in FIG. 4, in which the objective quantity $\dot{m}_{FUEL-OBJ}$ of fuel to be injected and the objective quantity $\dot{m}_{AIR-OBJ}$ of air to be fed are controlled in a differentiated manner so as to optimize the combustion inside the burner 21 and minimize the production of pollutants. FIG. 4 shows the development of the fuel injection time $t_{INJ}$, the pressure signal $P_{33}$ generated by the combustion inside the burner 21 and detected by the sensor 33, the air/fuel ratio $\lambda$ of the exhaust gases, the objective air/fuel ratio $\lambda_{OBJ}$ of the exhaust gases and the objective quantity $\dot{m}_{AIR-OBJ}$ of air to be fed.

The step indicated with $P_1$ starts in the instant in which the pumping device 24 is started; the objective fuel quantity $\dot{m}_{FUEL-OBJ}$ is zero, whereas the objective quantity $\dot{m}_{AIR-OBJ}$ of air to be fed and the duration of the step indicated with $P_1$ are variable as a function of the environmental conditions.

During the following step indicated with $P_2$, the objective quantity $\dot{m}_{FUEL-OBJ}$ of fuel to be injected and the objective quantity $\dot{m}_{AIR-OBJ}$ of air to be fed are variable as a function of the environmental conditions, whereas the duration of step $P_2$ is variable as a function of the start of combustion instant SOC. The step indicated with $P_2$ has a duration corresponding to the starting time SOC_T. During the following step indicated with $P_2$, the spark plug 28 coupled to the burner 21 to ignite the mixture present inside the combustion chamber 22 is started; furthermore, during the following step indicated with $P_2$, the high-frequency content $P_{33\_HF}$ of the pressure signal detected by the sensor 33 is analysed so as to determine the quantities described in the description above, namely the start of combustion instant SOC, the starting time SOC_T and the peak value $PK_{P2HF}$ of the high-frequency content $P_{33\_HF}$ of the pressure signal detected by the sensor 33.

As to the following step indicated with $P_3$, on the other hand, the duration of the step itself, the objective quantity $\dot{m}_{FUEL-OBJ}$ of fuel to be injected and the objective quantity $\dot{m}_{AIR-OBJ}$ of air to be fed are variable as a function of the starting time SOC_T and of peak value $PK_{P2HF}$ of the high-frequency content $P_{33\_HF}$ of the pressure signal detected by the sensor 33.

The duration of the last step indicated with $P_4$, the objective quantity $\dot{m}_{FUEL-OBJ}$ of fuel to be injected and the objective quantity $\dot{m}_{AIR-OBJ}$ of air to be fed, on the contrary, are variable as a function of the environmental conditions and of the requested thermal power.

The Applicant found out, through experiments, that the high-frequency content $P_{33\_HF}$ of the pressure signal detected by the sensor 33 identifies the end of combustion instant EOC represented by the instant in which the high-frequency content $P_{33\_HF}$ of the pressure signal detected by the sensor 33 is smaller than a threshold value $TV_{EOC}$. The threshold value $TV_{EOC}$ is determined in a preliminary set-up phase. The end of combustion instant EOC is used for the control and the diagnosis of the correct operation of the burner 21.

The Applicant further found out that, in case the burner 21 and the internal combustion engine 1 work simultaneously, the pressure signal detected by the sensor 33 is also affected by the exhaust stroke of the cylinder 3 (i.e. pressure components generated by the exhaust strokes of the cylinders 3 are detected). In particular, experiments revealed that, in the turning-off phase of the burner 21, the simple analysis of the high-frequency content $P_{33\_HF}$ of the pressure signal detected by the sensor 33 is not sufficient to identify the end of combustion instant EOC in a reliable manner. Hence, in this case, the pressure signal detected by the sensor 33, at first, is filtered with a band-pass filter in the neighbourhood of the injection frequency of the burner 21 and, subsequently, the high-frequency content $P_{33\_HF}$ of the pressure signal detected by the sensor 33 and filtered identifies the end of combustion instant EOC represented by the instant in which the high-frequency content $P_{33\_HF}$ of the pressure signal detected by the sensor 33 and filtered is smaller than a threshold value. The injection frequency of the burner 21 preferably is 200 Hz.

Figure 5:
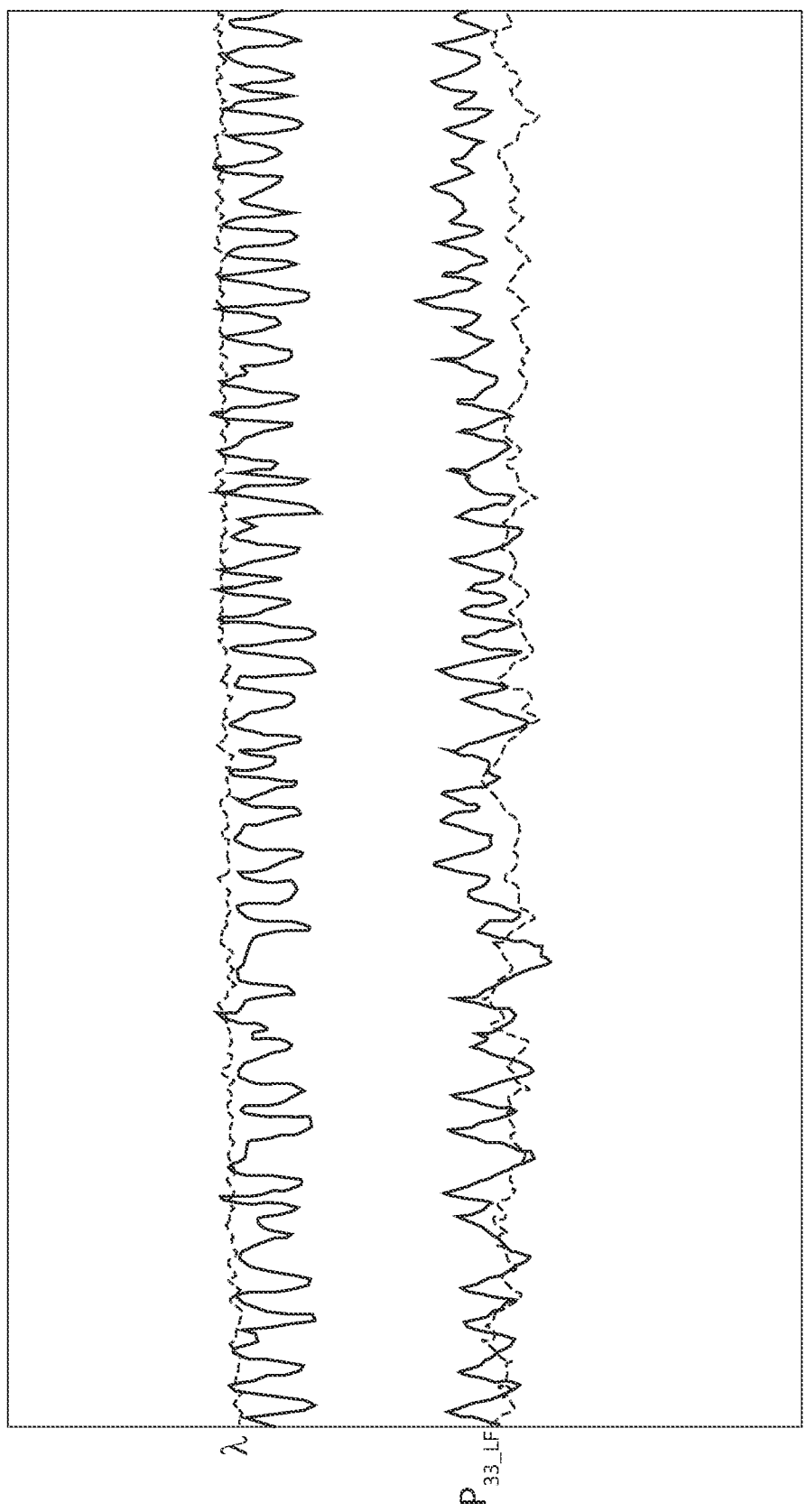

Finally, according to FIG. 5, which shows a comparison between the low-frequency content $P_{33\_LF}$ of the pressure signal detected by the sensor 33 and the development of the air/fuel ratio λ of the exhaust gases, the low-frequency content $P_{33\_LF}$ of the pressure signal detected by the sensor 33 is also rich in formation. More in detail, the low-frequency content $P_{33\_LF}$ of the pressure signal detected by the sensor 33 is correlated with the development of the air/fuel ratio λ of the exhaust gases. In particular, the Applicant found out, through experiments, that the low-frequency content $P_{33\_LF}$ of the pressure signal detected by the sensor 33 is strongly correlated with the signal detected by the UHEGO or UEGO linear oxygen sensor 18. The electronic control unit is suited to use the low-frequency content $P_{33\_LF}$ of the pressure signal detected by the sensor 33 in order to control the air/fuel ratio of the exhaust gases; the low-frequency content $P_{33\_LF}$ of the pressure signal detected by the sensor 33 is used to determine a correction factor, which allows the objective quantity $\dot{m}_{FUEL-OBJ}$ of fuel to be injected to be corrected, thus making the mixture richer or leaner.

The description above can advantageously be applied also in case of use of the signal coming from the temperature and pressure sensor 34 for the exhaust gases flowing out of the burner 21, which is housed along the outlet duct 35, instead of the signal coming from the temperature and pressure sensor 33 for the air flow fed to the burner 21, which is housed along the duct 25. In particular, the pressure signal acquired is the one generated by the combustion inside the combustion chamber 22 and detected by said temperature and pressure sensor 34; and the combustion inside the combustion chamber 22, in particular the objective quantity $\dot{m}_{FUEL-OBJ}$ of fuel to be injected into and the objective quantity $\dot{m}_{AIR-OBJ}$ of air to be fed to the combustion chamber 22, is controlled as a function of the pressure signal detected by said temperature and pressure sensor 34.

LIST OF REFERENCE NUMBERS 1 internal combustion engine
2 exhaust system
3 cylinders
4 intake manifold
5 exhaust manifold
6 intake duct
7 air filter
8 throttle valve
9 air flow meter
10 exhaust duct
11 turbocharger
12 turbine
13 compressor
14 after-treatment system
15 pre-catalytic converter
16 particulate filter
17 catalytic converter
18 linear sensor
19 lambda sensor
20 lambda sensor
21 burner
22 combustion chamber
23 air feeding circuit
24 pumping device
25 duct
26 shut-off valve
27 injector
28 spark plug
29 fuel feeding circuit
30 pumping device
31 duct
33 P, T sensor
34 P, T sensor
35 outlet duct
36 P, T sensor
38 valve
39 air tank
ECU electronic control unit

The invention claimed is:

1. A method to control an exhaust gas after-treatment system (14) for an exhaust system (2) of an internal combustion engine (1) having an exhaust duct (10); the system (14) comprises at least one catalytic converter (15, 17) arranged along the exhaust duct (10) and a burner (21), which is suited to introduce exhaust gases into the exhaust duct (10) to speed up the heating of said at least one catalytic converter (15, 17), wherein inside the burner (21) there is defined a combustion chamber (22), which receives fresh air through an air feeding circuit (23), which is provided with a pumping device (24) housed along a first duct (25), and receives fuel from an injector (27) for injecting fuel into the combustion chamber (22), and a spark plug (28) coupled to the burner (21) for the ignition of the mixture present inside the combustion chamber (22); the method comprises the steps of:
   housing a pressure sensor (33, 34) along the first duct (25) interposed between the pumping device (24) and the burner (21) or along a second duct (35) leaving the burner (21);
   acquiring the pressure signal ($P_{33}$) detected by said pressure sensor (33, 34) following the combustion inside the combustion chamber (22); and
   controlling the combustion inside the combustion chamber (22), i.e. controlling an objective quantity ($\dot{m}_{FUEL-OBJ}$) of fuel to be injected into the combustion chamber (22) and an objective quantity ($\dot{m}_{FUEL-OBJ}$) of air to be fed to the combustion chamber (22), as a function of a high-frequency content ($P_{33\_HF}$) of the pressure signal ($P_{33}$) detected by said pressure sensor (33, 34).

2. The method according to claim 1 and comprising the further step of measuring a peak value ($PK_{P2HF}$) of the high-frequency content ($P_{33\_HF}$) of the pressure signal detected by said sensor (33, 34).

3. The method according to claim 1 and comprising the further step of identifying a start of combustion instant (SOC) represented by the instant in which the high-frequency content ($P_{33\_HF}$) of the pressure signal detected by said sensor (33, 34) is greater than a first threshold value ($TV_{SOC}$).

4. The method according to claim 3 and comprising the further step of identifying a starting time (SOC_T) through a difference between a start of injection instant (SOI) and the start of combustion instant (SOC).

5. The method according to claim 4 and comprising the further step of determining the objective quantity ($\dot{m}_{FUEL-OBJ}$) of fuel to be injected into and the objective quantity ($\dot{m}_{FUEL-OBJ}$) of air to be fed to the combustion chamber (22) as a function of the starting time (SOC_T) and of a peak value ($PK_{P2HF}$) of the high-frequency content ($P_{33\_HF}$) of the pressure signal detected by said sensor (33, 34).

6. The method according to claim 1 and comprising the further step of identifying an end of combustion instant (EOC) represented by the instant in which the high-frequency content ($P_{33\_HF}$) of the pressure signal detected by said sensor (33, 34) is smaller than a second threshold value ($TV_{EOC}$).

7. The method according to claim 6 and comprising the further step of using the end of combustion instant (EOC) to recognize faults or malfunctions of the burner (21).

8. The method according to claim 6 and comprising the further steps of:
   filtering with a band-pass filter in the neighborhood of the injection frequency of the burner (21) the pressure signal detected by said sensor (33, 34); and
   identifying an end of combustion instant (EOC) as the instant in which the high-frequency content ($P_{33\_HF}$) of the filtered pressure signal is smaller than a threshold value.

9. A method to control an exhaust gas after-treatment system (14) for an exhaust system (2) of an internal combustion engine (1) having an exhaust duct (10); the system (14) comprises at least one catalytic converter (15, 17) arranged along the exhaust duct (10) and a burner (21), which is suited to introduce exhaust gases into the exhaust duct (10) to speed up the heating of said at least one catalytic converter (15, 17), wherein inside the burner (21) there is defined a combustion chamber (22), which receives fresh air through an air feeding circuit (23), which is provided with a pumping device (24) housed along a first duct (25), and receives fuel from an injector (27) for injecting fuel into the combustion chamber (22), and a spark plug (28) coupled to the burner (21) for the ignition of the mixture present inside the combustion chamber (22); the method comprises the steps of:
   housing a pressure sensor (33, 34) along the first duct (25) interposed between the pumping device (24) and the burner (21) or along a second duct (35) leaving the burner (21);
   acquiring a pressure signal ($P_{33}$) detected by said pressure sensor (33, 34) following combustion inside the combustion chamber (22); and
   controlling the combustion inside the combustion chamber (22), by controlling an objective quantity ($\dot{m}_{FUEL-OBJ}$) of fuel to be injected into the combustion chamber (22) and an objective quantity ($\dot{m}_{FUEL-OBJ}$) of air to be fed to the combustion chamber (22), as a function of a low-frequency content ($P_{33\_LF}$) of the pressure signal ($P_{33}$) detected by said pressure sensor (33, 34).

10. The method according to claim 9 and comprising the further step of determining a correction factor, which allows the objective quantity ($\dot{m}_{FUEL-OBJ}$) of fuel to be injected into the combustion chamber (22) to be corrected as a function of the low-frequency content ($P_{33\_LF}$) of the pressure signal detected by said sensor (33, 34).

\* \* \* \* \*